(12) United States Patent
Mana et al.

(10) Patent No.: US 9,033,380 B2
(45) Date of Patent: May 19, 2015

(54) ENERGY ABSORBER WITH STAGGERED, VERTICALLY ORIENTED CRUSH LOBES

(71) Applicants: Dinesh Mana, Bangalore (IN); Matthew D. Marks, Waterford, MI (US)

(72) Inventors: Dinesh Mana, Bangalore (IN); Matthew D. Marks, Waterford, MI (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/872,701

(22) Filed: Apr. 29, 2013

(65) Prior Publication Data

US 2013/0313841 A1 Nov. 28, 2013

Related U.S. Application Data

(60) Provisional application No. 61/650,498, filed on May 23, 2012.

(51) Int. Cl.
   *B60R 19/18* (2006.01)
   *B60R 19/30* (2006.01)

(52) U.S. Cl.
   CPC ............. *B60R 19/30* (2013.01); *B60R 19/18* (2013.01); *B60R 2019/1833* (2013.01); *B60R 2019/1866* (2013.01)

(58) Field of Classification Search
   USPC ............. 293/120, 121, 122, 102; 296/187.04, 296/187.03, 187.09
   See application file for complete search history.

(56) References Cited

U.S. PATENT DOCUMENTS

| | | | |
|---|---|---|---|
| 3,933,387 A | 1/1976 | Salloum et al. | |
| 6,406,081 B1 | 6/2002 | Mahfet et al. | |
| 6,866,313 B2 | 3/2005 | Mooijman et al. | |
| 6,994,384 B2 | 2/2006 | Shuler et al. | |
| 7,086,690 B2 | 8/2006 | Shuler et al. | |
| 7,163,242 B2 | 1/2007 | Shuler et al. | |
| 7,188,876 B2 * | 3/2007 | Jaarda et al. | 293/133 |

(Continued)

FOREIGN PATENT DOCUMENTS

| | | |
|---|---|---|
| EP | 1427608 B1 | 7/2006 |
| EP | 1373024 B1 | 1/2009 |

(Continued)

OTHER PUBLICATIONS

Korean Patent No. 1004181 (B1); Publication Date: Dec. 24, 2010; Abstract Only; 1 Page.

(Continued)

*Primary Examiner* — Joseph D Pape
(74) *Attorney, Agent, or Firm* — Cantor Colburn LLP (57) ABSTRACT

A thermoplastic energy absorber having a horizontal axis and a vertical axis, and comprise: an array of energy absorbing lobes protruding from a base, the lobes arranged in two or more rows. The energy absorbing lobes can have a vertical length (L) and a horizontal width (D), and wherein a ratio of L:D is greater than 1. The energy absorbing lobes in each row can be disposed in a staggered manner with respect to energy absorbing lobes in an adjacent row. The energy absorber can be configured to be installed on a vehicle for absorption of impact energy. An energy absorbing system can comprise the thermoplastic energy absorber disposed between a bumper beam and a fascia. The fascia can optionally be configured to envelope the thermoplastic energy absorber and the bumper beam. This system passes EuroNCAP lower-leg impact requirements, version 5.1, June 2011, for lower leg impact requirement.

13 Claims, 6 Drawing Sheets

(56) References Cited

U.S. PATENT DOCUMENTS

| | | |
|---|---|---|
| 7,222,896 B2 | 5/2007 | Evans |
| 7,278,667 B2 | 10/2007 | Mohapatra et al. |
| 7,533,927 B2 | 5/2009 | Ito et al. |
| 7,699,367 B2 | 4/2010 | Evans et al. |
| 7,806,448 B2 | 10/2010 | Allen et al. |
| 8,016,331 B2 | 9/2011 | Ralston et al. |
| 2002/0149214 A1 | 10/2002 | Evans |
| 2007/0200376 A1 | 8/2007 | Jaarda et al. |
| 2011/0221213 A1 | 9/2011 | Riviere et al. |
| 2012/0032458 A1* | 2/2012 | Brooks et al. ............... 293/120 |
| 2012/0104778 A1* | 5/2012 | Mana et al. ............... 293/133 |

FOREIGN PATENT DOCUMENTS

| | | |
|---|---|---|
| EP | 1836072 B1 | 3/2009 |
| EP | 2062787 A1 | 5/2009 |
| EP | 1791727 B1 | 9/2009 |
| EP | 2237992 B1 | 8/2011 |
| FR | 2905324 A1 | 3/2008 |
| FR | 2915943 A1 | 11/2008 |
| FR | 2933055 A1 | 1/2010 |
| KR | 2008009044 A | 1/2008 |
| KR | 812054 B1 | 3/2008 |
| KR | 1004181 B1 | 12/2010 |
| WO | 2005012043 A1 | 2/2005 |
| WO | 2009120023 A2 | 10/2009 |
| WO | 2011057103 A1 | 5/2011 |
| WO | 2011092342 A1 | 8/2011 |

OTHER PUBLICATIONS

Korean Patent No. 2008009044 (A); Publication Date: Jan. 24, 2008; Abstract Only; 1 Page.

International Publication No. 2009120023 (A2); Publication Date: Oct. 1, 2009; Abstract Only; 1 Page.

International Publication No. 2011092342 (A1); Publication Date: Aug. 4, 2011; Abstract Only; 1 Page.

French Patent No. 2905324 (A1); Publication Date: Mar. 7, 2008; Abstract Only; 1 Page.

French Patent No. 2915943 (A1); Publication Date: Nov. 14, 2008; Abstract Only; 1 Page.

French Patent No. 2933055 (A1); Publication Date: Jan. 1, 2010; Abstract Only; 1 Page.

Korean Patent No. 812054 (B1); Publication Date: Mar. 7, 2008; Abstract Only; 1 Page.

International Search Report; International Application No. PCT/US2013/04218; International Filing Date: May 22, 2013; 4 Pages.

Written Opinion of the International Searching Authority; International Application No. PCT/US2013/04218; International Filing Date: May 22, 2013; 4 Pages.

International Preliminary Report on Patentability; International Application No. PCT/US2013/042128; International Filing Date May 22, 2013; 12 pages.

* cited by examiner

ENERGY ABSORBER WITH STAGGERED, VERTICALLY ORIENTED CRUSH LOBES

CROSS-REFERENCE TO RELATED APPLICATION

This application claims the benefit of U.S. Provisional Patent Application Ser. No. 61/650,498 filed May 23, 2012. The related application is incorporated herein by reference.

TECHNICAL FIELD

The present disclosure relates generally to energy absorbers for use in a vehicle, for example, to reduce injuries (e.g., to occupant(s), pedestrian(s), etc.) as well as to reduce vehicle damage.

BACKGROUND

Modern vehicles have bumper systems tuned for particular energy absorption profile during a vehicle-to-vehicle impact and/or vehicle-to-barrier impact. However, tuning of bumper systems can be challenging due to conflicting design requirements, such as limitations on the packaging space occupied by the bumper system (i.e., energy absorber and/or bumper beam), limitations on bumper beam flexure and rear intrusion into the space behind the bumper beam, and limitations on cost, quality, dimensional consistency and consistency/predictability of the impact energy-absorbing profile during the impact stroke itself.

Additionally, in Europe and the Pacific region, the Economic Commission for Europe (ECE) 42 (1 Jun. 1980) and Research Council for Automobile Repair (i.e., low speed 15 kilometers per hour (kph)), Offset Insurance Crash Test to determine damageability and repairability features of a Motor Vehicle, January 1999 (hereinafter "RCAR") require that bumper systems at both the front and rear side of the vehicle withstand impact as specified in these standards. In the U.S., a vehicle has to meet Federal Motor Vehicle Safety Standards (FMVSS, i.e. Title 49 of the Code of Federal Regulation (CFR) part 581; hereinafter "FMVSS part 581") and RCAR, and the Insurance Institute for Highway Safety 10 kph low speed frontal and rear test, May 2006 (hereinafter "IIHS 10 kph test"). Economic Commission for Europe (ECE) regulation No. 42 is similar to FMVSS part 581, but slightly less stringent, specifying performance requirements for passenger cars in low-speed front and rear collisions.

FMVSS part 581 applies to front and rear bumpers on passenger cars to prevent the damage to the car body and safety related equipment. It requires that a car's expensive parts such as tailgate, fog lamp, back panel, etc., continue to operate normally after the car has been impacted by a pendulum or moving barrier on the front or rear longitudinally at 4 kilometers per hour (kph; about 2.5 miles per hour (mph)) and on the front and rear corner at 2.5 kph (~1.5 mph) at varying heights (15 inches (381 millimeters (mm) to 21 inches (533 mm))) from the ground. Economic Commission for Europe (ECE) regulation No. 42 is less stringent as the reference height of the pendulum impactors from the ground is fixed as 455 mm (about 18 inches) from the ground front.

There is a continuing need for lighter weight energy absorbers that meet governmental standards and original equipment manufacturers (OEM) space limitations.

SUMMARY

Disclosed, in various embodiments, are energy absorbing systems that can be used in conjunction with various vehicle components.

A thermoplastic energy absorber having a horizontal axis and a vertical axis, can comprise: an array of energy absorbing lobes protruding from a base, the lobes arranged in two or more rows. The energy absorbing lobes can have a vertical length (L) and a horizontal width (D), and wherein a ratio of L:D is greater than 1. The energy absorbing lobes in each row can be disposed in a staggered manner with respect to energy absorbing lobes in an adjacent row. The energy absorber can be configured to be installed on a vehicle for absorption of impact energy.

An energy absorbing system can comprise the thermoplastic energy absorber disposed between a bumper beam and a fascia. The fascia can optionally be configured to envelope the thermoplastic energy absorber and the bumper beam. This system passes EuroNCAP lower-leg impact requirements, version 5.1, June 2011, for a lower leg impact requirement.

The foregoing and other features will be more readily apparent from the following detailed description, examples, and drawings of the illustrative embodiments.

BRIEF DESCRIPTION OF THE DRAWINGS

The features of the thermoplastic energy absorber described will become apparent from the following detailed description when read in conjunction with the drawings, which are exemplary, not limiting, and wherein like elements are numbered alike in several figures.

DETAILED DESCRIPTION

It has been determined that current solutions provided for meeting the various governmental standards such as FMVSS part 581 and ECE 42 are non-optimal when considered from the point of height mismatch impact between the vehicle energy absorbing system and an impactor. The objective of the current disclosure is to design unitary light-weight, thermoplastic energy absorber (EA) solutions incorporating vertically placed energy absorbing lobes, which can be used in several combinations to meet each of the global requirements, but can be used for any other application where energy needs to be absorbed for varying impact positions at low speeds. The present system enables reduced manufacturing by reducing the amount of material used in each energy absorber system. In other words, the thermoplastic energy absorber can be tuned and used in several combinations to meet the global damageability requirements across various global platforms and regulatory standards.

Disclosed herein, in various embodiments, are thermoplastic energy absorbers which can be used in conjunction with vehicle components, e.g., to minimize vehicle damage and/or injury suffered during an impact. The thermoplastic energy absorbers disclosed herein can be used in the front and/or rear of a vehicle, e.g., attaching to the vehicle's bumper beam and/or side rails. The thermoplastic energy absorber can optionally partially envelope the vehicle's bumper beam, being supported by the top of the bumper beam and/or the bottom of the bumper beam, thereby providing energy absorbing capabilities in circumstances where the impact between the vehicle's bumper beam and the impactor is height-mismatched. In other words, the energy absorber can have a height, in the "y" direction (i.e., the vertical direction), that is greater than a bumper beam height in the "y" direction where a portion of the impact is above or below the bumper beam. As a result, if the impact is partially or wholly above or below the bumper beam, the energy absorber is still capable of absorbing energy from the impact. In these embodiments, the energy absorber will extend over the top and/or bottom of the bumper beam, e.g., such that the top/bottom (as appropriate) of the bumper beam can provide support to the energy absorber during impact.

The thermoplastic energy absorber can comprise an array of energy absorbing lobes protruding from a base, the lobes arranged in two or more horizontally extending rows (e.g., extending in the "x" direction (i.e., in the horizontal (also known as the longitudinal direction; e.g., the major axis)), wherein the energy absorbing lobes have a vertical length (L) (measured in the "y" direction) longer than horizontal width (D), measured in the "x" direction, (e.g., the length ratio of L:D is greater than 1), wherein each measurement is taken at the widest point in that direction. For example, the L:D ratio can be 10:9 to 5:1, specifically, 5:4 to 10:3

The energy absorbing lobes in each row are disposed in a staggered manner with respect to energy absorbing lobes in an adjacent row. The vertically oriented energy absorbing lobes (i.e., lobes that are larger in the "y" direction than in the "x" direction; having a ratio of L:D of greater than 1) provide protection to the bumper beam in circumstances where the impact between the vehicle's bumper beam and the impactor is height-mismatched and enables the system to pass the more stringent test standards such as FMVSS part 581 directed to the impact at varying height. Vertical staggering of the lobes allows impact standards to be met while reducing the mass of the energy absorber, e.g., as compared to a similar energy absorber without vertically staggered lobes.

The array of crush lobes can take support from the top and/or bottom surface of the vehicle's bumper beam as opposed to an arrangement where the energy absorbing lobes take support only from the vertical surface of the beam (i.e., the front face). These lobes can extend above and/or below the bumper beam in the vertical direction. In other words, the lobes can extend above and/or below the bumper beam by up to 70% of L, specifically, greater than (>) zero % to 70% of L, more specifically, 10% to 60%, and more specifically, 15% to 50% of L. Optionally the lobes can wrap around an edge of a bumper beam (e.g., extend across two surfaces of the bumper beam; see FIG. 6). The energy absorbing lobes are capable of being designed in such a way that they can have aspect ratio (ratio of vertical dimension (L) to horizontal dimension (D)) greater than unity and can also be tuned to meet the pedestrian leg impact requirements. When multiple rows of crush lobes are employed, each row (wherein a row is determined in the vertical direction) can have the same or a different L than an adjacent row. For example, the upper row (determined in the vertical direction) can have a larger "L" than an adjacent, lower row. For example, the length of the lower row, $L_1$, can be less than or equal to 9% of the length of the "upper row," $L_u$ (i.e., $L_1 \leq 95\% L_u$), specifically, less than or equal to 90% $L_u$, more specifically, less than or equal to 80% $L_u$, and yet more specifically, less than or equal to 70% $L_u$.

The thermoplastic energy absorber can comprise any plastic material or combination of plastic materials that can be formed into the desired shape and provide the desired properties. Some desirable characteristics of the thermoplastic energy absorber include high toughness/ductility, thermal stability, high energy absorption efficiency, a good modulus-to-elongation ratio, and recyclability, among others, wherein "high" and "good" are intended to mean that the characteristic at least meets vehicle safety regulations and requirements for the given component/element. Examples of materials for use as the thermoplastic energy absorber, energy absorbing lobes, and/or the various reinforcement ribs include thermoplastic materials as well as combinations of thermoplastic materials with elastomeric materials, and/or thermoset materials. Possible thermoplastic materials include at least one of the foregoing polybutylene terephthalate (PBT); acrylonitrile-butadiene-styrene (ABS); polycarbonate (PC); polycarbonate/PBT (PC/PBT) blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP), expanded polypropylene (EPP); and thermoplastic olefins (TPO). For example, the plastic component can comprise Xenoy*, which is commercially available from SABIC Innovative Plastics IP B.V. The thermoplastic energy absorber, energy absorbing lobes, and/or the various reinforcement ribs can also be formed from combinations comprising at least one of any of the above-described materials. The thermoplastic energy absorber, energy absorbing lobes, and/or the various reinforcement ribs can be free of metals. The term "elastomeric" or "elastomeric material" refers in an embodiment to crosslinked thermosetting rubbery polymers that are more easily deformable than plastics. The thermoplastic energy absorber and energy absorbing lobes can comprise the same plastic material, or the thermoplastic energy absorber and energy absorbing lobes can each independently comprise a plastic material (e.g., thermoplastic material) that is different from each other. Likewise, the various reinforcement ribs can each independently comprise a plastic material (e.g., thermoplastic material) that is different from each other.

The thermoplastic energy absorber, energy absorbing lobes can be manufactured utilizing various molding processes (e.g., injection molding, thermoforming, etc.). The energy absorber, comprising all of the lobes, can be a single unitary piece (e.g., an integrally formed energy absorber). This energy absorber can be an elongated member that has a sufficient length to extend across the front or rear of a vehicle, e.g., at least across the vehicle's bumper beam.

As is noted above, provided is an energy absorbing system comprising of an array of a plurality of vertically oriented crush lobes arranged intermittently in two or more rows, e.g. alternating between protruding and not protruding in a horizontal direction with lobes in adjacent rows being placed with a vertical offset. In other words, the energy absorbing lobes can be offset to the point where the lobes are disposed intermittently in the vertical direction as well. The amount of spacing between the lobes of adjacent rows is desirably a balance between maximum separation and the presence of at least one crush lobe being located at any cross-section of the energy absorber taken in the "y" direction. (See FIG. 2) Also provided is an energy absorbing system, whose energy absorbing lobes can take support from the top or bottom surface of the fixed support (e.g. a bumper beam in the case of automobiles) to which it is mounted.

For example, the energy absorbing system can be a unitary component, which is a combination of an array of a plurality of energy absorbing lobes disposed in two or more rows, specifically 2 to 4 rows. The energy absorbing lobes are intermittently arranged in the horizontal direction (e.g. within the row) with a vertical offset (e.g. in adjacent rows). When the energy absorbing lobe array is disposed in two rows, this configuration results in a unique arrangement so that at least one lobe is present at every vertical aspect of the energy absorbing system. This feature ensures the presence of at least one crush lobe at all vertical cross-sections along the attachment structure (e.g., bumper beam). Hence energy absorption is enabled at a reduced cost due to reduced amount of material.

Accordingly, the energy absorbing system, mounted over the bumper beam, can be able to absorb the energy for all the impact cases, for example high/low center, high/low outerboard, and/or high/low corner. This can result in the reduced intrusion levels compared with similar energy absorbers where energy absorbing lobes are horizontally disposed as well as not yielding any damage to the vehicle parts as per the requirements of FMVSS part 581 and/or ECE 42 for example. Each of the energy absorbing lobes can be designed in such a way that their aspect ratio (ratio of its vertical dimension (L) to horizontal dimension (D)) is more than unity (L/D>1), for example, L/D can be 1.5 to 5, specifically, 2 to 4, more specifically, 2.5 to 3.5, and any ratio therebetween. For example, L/D aspect ratio can be 2.

The vertical dimension (L) of the energy absorbing lobe can be, for example, up to 40 centimeters (cm) long and will depend on the vertical axis length of the vehicle's bumper beam, specifically, 2 to 20 cm, more specifically, 2 to 10 cm, and yet more specifically 3 to 6 cm. For example, vertical dimension (L) can be selected such that the energy absorbing lobe will cover 20 to 50%, specifically, 10 to 40%, more specifically, 25 to 35% of the vertical axis length of the bumper beam.

The horizontal dimension (D) of the energy absorbing lobe can additionally be 3 to 20 cm wide and will depend upon the L:D ratio and on the number of energy absorbing lobes in each row of the array. For example, when each row can have 4 to 24 energy absorbing lobes intermittently disposed in each row, horizontal dimension (D) can be 3 to 9 cm long, or 3 to 8, 3 to 7, or 3 to 6 cm long. Specifically, horizontal dimension (D) can be 4 cm long.

Figure 6:
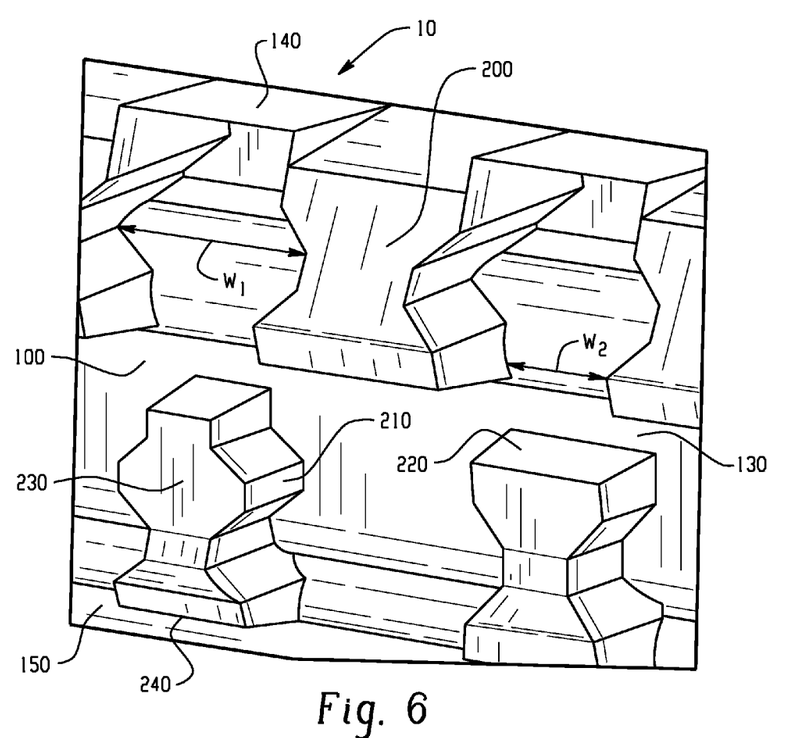
FIG. 6 is a partial prospective view of another embodiment of a thermoplastic energy absorber.
Figure 7A:
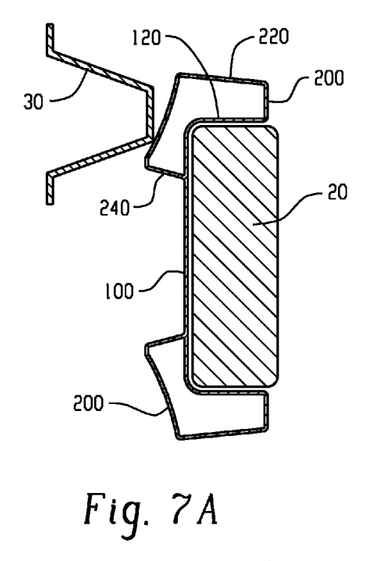
FIGS. 7A and 7B illustrate, respectively, a high impact and a low impact of mismatched height of an impactor with upper and lower energy absorber lobes supported by the top and bottom of a bumper beam.
Figure 7B:
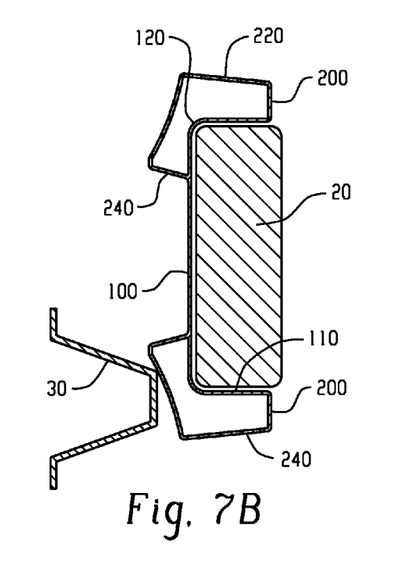

The energy absorbing system may take support from the top portion of the bumper beam by having a surface which conforms to the top of the vehicle's bumper beam and where the energy absorbing lobes in the top row bracket (e.g. having an L-shape side cross-section, along the "y" direction (e.g., a rounded L-shape) such as in FIGS. 6, 7A, and 7B)) the top surface of the vehicle's bumper beam. Similarly, the energy absorbing system can also take support from the bottom portion of the beam by, for example having a surface which conforms to the bottom of the vehicle's bumper beam and where the energy absorbing lobes in the bottom row bracket the bottom surface of the vehicle's bumper beam. These kinds of designs are extremely useful, for example, in those circumstances, where there is a large vertical offset between the beam and the impactor position.

Stiffness of the energy absorbing lobes can be tuned in such a way that it meets the pedestrian impact requirements. Tuning the stiffness of the energy absorbing lobes can be performed for example by changing the profile of the energy absorbing lobes' side walls, top walls, and/or bottom walls, from perpendicular to the base (e.g., 90°) to angled (i.e., non-perpendicular to the base), and/or changing the wall(s) from straight to curved (e.g., semi-circular, semi-parabolic, semi-elliptical, and the like). The angle (Ø) of the walls extending from the base can be 90 to 145 degrees, specifically, 100° to 135°, more specifically, 105° to 130°, and still more specifically, 110° to 125°, and/or any range therebetween, such as 90° to 100°. The angle defined between the top wall of the lobe and the base can be the same or different from the angle defined between the bottom wall of the energy absorbing lobe and the thermoplastic energy absorber's base. Likewise, the angle defined between the top wall of the energy absorbing lobe and the thermoplastic energy absorber's base can be the same or different than the angle defined between the side wall of the energy absorbing lobe and the thermoplastic energy absorber's base. For example, the angle at which the straight walls of the energy absorbing lobe protrude from the thermoplastic energy absorber base is 95 degrees. Likewise, curved walls may define a radius that can be varied to modulate the stiffness of the energy absorbing lobe. Accordingly, the radius defined can be 5 centimeters (cm) to 75 cm. Likewise, each of the energy absorbing lobes can also define a front face having different shapes such as hexagonal, ellipsoidal, rectangular, and other polygons or combination of polygons, for example a polygon having a corrugated circumference (e.g., a periphery that undulates so that the body width diverges, converges, and diverges and/or the body width converges, diverges, and converges). In other words, the lobes can have an hour glass-like shape. The lobe can also have area(s) of constant width. For example, the width can be constant/diverge/converge/constant/diverge with optional constant sections between the diverge/converge sections. Likewise, the front face of the energy absorbing lobe can be flat or convex, thus providing for example an additional tuning capability to the stiffness of the energy absorbing lobe and/or the force/displacement profile experienced upon impact.

Additional tuning the stiffness of the thermoplastic energy absorber and its energy absorbing lobes can be accomplished through the selection of the various wall thickness of the energy absorbing lobes. Accordingly, the thickness of each of the energy absorbing lobes' side walls can vary, e.g., 0.1 millimeter (mm) to 10 mm. For example 0.5 mm to 8 mm, specifically, 0.5 mm to 5 mm, more specifically, 1 mm to 3 mm, thick side wall of the energy absorbing lobe is possible. Similarly, the thickness of each of the energy absorbing lobes' top and/or bottom walls can be the same or different and can be 0.2 mm to 13 mm. For example the energy absorber can have 0.5 mm to 10 mm, specifically, 0.5 mm to 8 mm, more specifically, 1 to 6, and yet more specifically, 1 to 4 mm thick top and/or bottom wall of the energy absorbing lobe. Further tuning of the stiffness of the energy absorbing lobe can be achieved since the aspect ratio of the energy absorbing lobe is larger than unity, by making the side walls thinner or thicker than the top wall and/or bottom wall, at a fixed ratio.

Tuning the stiffness of the thermoplastic energy absorber can be further modulated by varying the depth of the protruding energy absorbing lobes. Varying the depth will affect the stroke length absorbed by the energy absorbing lobe. Likewise, the depth of the energy absorbing lobe can be the same or different along the horizontal axis of the thermoplastic energy absorber and will depend on the desired performance and packaging space, in other words the space occupied by the thermoplastic energy absorber existing between the support beam and the fascia for example. The depth of the energy absorbing lobe can be 1 to 50 cm deep, in other words the distance between the front face of the energy absorbing lobe and the thermoplastic energy absorber base. For example, the energy absorber lobe's depth can be >0 to 45 cm, specifically, 0.1 to 25 cm, more specifically, 0.2 to 10, yet more specifically, 0.3 cm to 5 cm, and yet more specifically, 0.4 cm to 1 cm deep. Specifically, the energy absorber lobe's depth can be 5 mm deep.

The number of energy absorbing lobes in each row of the array of the unitary thermoplastic energy absorber can be further modulated to provide additional tuning by varying the number of energy absorbing lobes in each row. Accordingly, the number of energy absorbing, vertically oriented lobes can be 4 to 40 lobes per row. For example, the number of energy absorbing, vertically oriented lobes can be 15 to 35 lobes per row, specifically, 8 to 35, more specifically, 10 to 30, yet more specifically, 15 to 25 energy absorbing lobes per row. Similarly, the energy absorbing lobes can be disposed equidistance from each other in the same row or at varying distance from each other in the same row. Specifically the number of energy absorbing, vertically oriented lobes can be 20.

The staggering degree of offset between energy absorbing lobes in adjacent row can be fixed or varied along the horizontal axis of the thermoplastic energy absorber. For example, a left side wall of an energy absorbing lobe in one row may align with the right side wall of the energy absorbing lobe in an adjacent row. Alternatively, the centerline of an energy absorbing lobe in one row may align with the right or left side wall of the energy absorbing lobe in an adjacent row.

The overall size, e.g., the specific dimensions of the thermoplastic energy absorbers described herein will depend upon their location in the vehicle (front and/or rear) and their function, as well as the particular vehicle for which they are intended. For example, the length (l), height (h), and width (w) of the thermoplastic energy absorbers will depend upon the amount of space available in the desired location of use (e.g. "packaging") as well as the needed energy absorption profile.

A more complete understanding of the components, processes, and apparatuses disclosed herein can be obtained by reference to the accompanying drawings. These figures (also referred to herein as "FIG.") are merely schematic representations based on the convenience and ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 1:
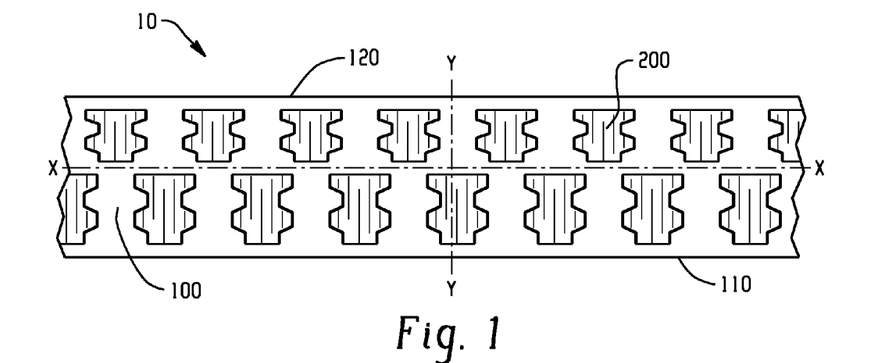
FIG. 1 is a partial front view of the energy absorber (EA).

FIG. 1 is a front view of an embodiment of the thermoplastic energy absorber (10), showing horizontal axis X-X and vertical axis Y-Y, with energy absorbing lobe (200) disposed intermittently in an array of two rows where energy absorbing lobes (200) in the top row are staggered in relation to energy absorbing lobes (200) in the bottom row. Also illustrated in FIG. 1 are the thermoplastic energy absorber base (100), the thermoplastic energy absorber upper bracket (120), thermoplastic energy absorber lower bracket (110), and optional thermoplastic energy absorber central reinforcing rib (130). The thermoplastic energy absorber upper bracket (120) can be configured to matingly straddle the top of the support beam (20, not shown), providing support for thermoplastic energy absorber (10) upon high impact. Likewise, thermoplastic energy absorber lower bracket (110) can be configured to matingly straddle the bottom of the support beam (20, not shown) providing support for thermoplastic energy absorber (10) upon low impact.

Figure 2:
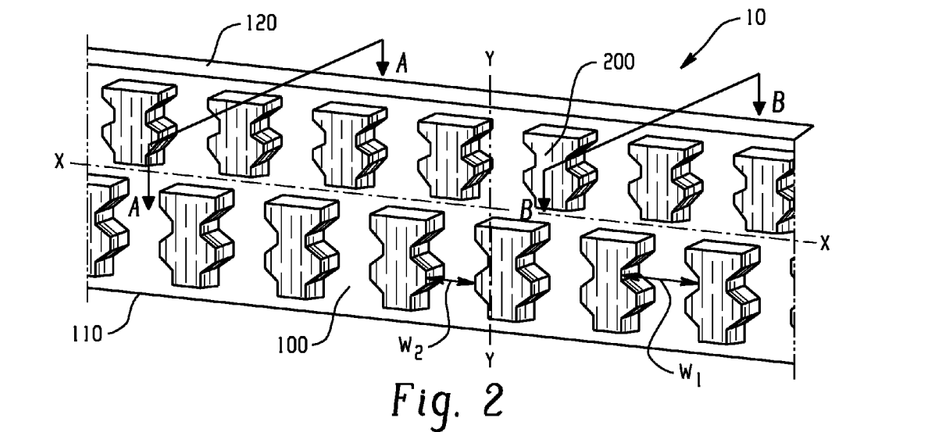
FIG. 2 is a partial front perspective view of the thermoplastic energy absorber of FIG. 1.
Figure 3:
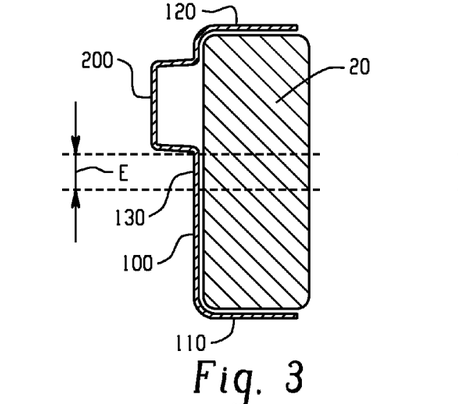
FIG. 3 is a cross-sectional view taken along lines A-A of FIG. 2 illustrating the thermoplastic energy absorber at that point and a vehicle bumper beam.
Figure 4:
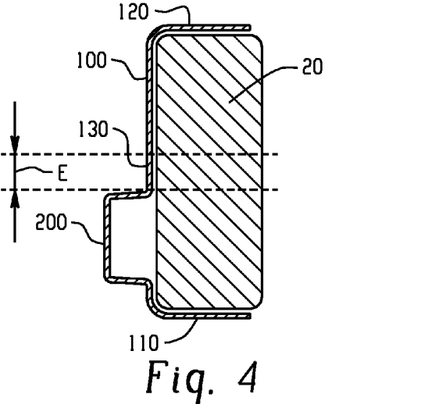
FIG. 4 is a cross-sectional view taken along lines B-B of FIG. 2 illustrating the thermoplastic energy absorber at that point and a vehicle bumper beam.
Figure 5A:
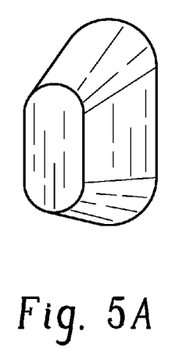
FIGS. 5A-5D are perspective views of various embodiments of energy absorber lobe shapes.
Figure 5B:
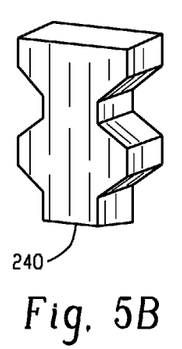
Figure 5C:
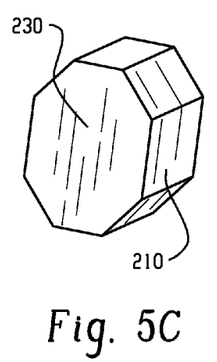
Figure 5D:
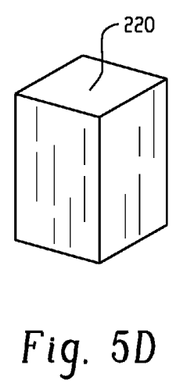

Turning now to FIGS. 2 and 3, illustrating the staggered manner of energy absorbing lobes (200) shown in an isometric view in FIG. 2, depicting horizontal axis X-X and vertical axis Y-Y, where 7 polygon-shape energy absorbing lobes (200) having corrugated circumference are disposed intermittently in two rows, with energy absorbing lobes (200) in each row being offset from the energy absorbing lobes (200) in the adjacent row, such that the right of one energy absorbing lobe (200) aligns with the left of energy absorbing lobes (200) in the adjacent row. The offset yielding a cross section along sections A-A and B-B illustrated in FIG. 3. As shown in FIG. 3, when two rows of energy absorbing lobes (200) are disposed on thermoplastic energy absorber (10), at each point along horizontal axis X-X, only two energy absorbing lobes (200) will be present, protruding from thermoplastic energy absorber base (100) with a vertical gap E defined between the bottom of the energy absorbing lobes (200) in the top row and the top of the energy absorbing lobes (200) in the bottom row. Optionally, the energy absorber central reinforcement rib (130) will be present in the gap, to provide further support to thermoplastic energy absorber (10). Accordingly vertical gap E can be 0.1 to 15 cm. For example, vertical gap E can be 1 to 15 cm, 1 to 12 cm, 1 to 8 cm, or 1 to 5 cm.

FIG. 3 also shows thermoplastic energy absorber upper bracket (120), configured to matingly straddle the top of support beam (20) thus providing support for thermoplastic energy absorber (10) upon high impact. Similarly shown in FIG. 3, is thermoplastic energy absorber lower bracket (110), configured to matingly straddle the bottom of support beam (20) thus providing support for thermoplastic energy absorber (10) upon low impact.

Turning now to FIGS. 5A-5D, illustrating embodiments of the various three dimensional configuration possible for energy absorbing lobes (200). As shown, energy absorbing lobes (200) protruding from thermoplastic energy absorber base (100), can have side wall (210), top wall (220), bottom wall (240) and front face (230). Although FIGS. 5A-5D show hexagonal, ellipsoidal, rectangular and polygonal front face (230) having corrugated circumference, other similar polygon shaped configurations can be used, so long as the aspect ratio of the vertical dimension (L) over the horizontal dimension (D) (shown for example in FIGS. 8A and 8B) is larger than unity.

Turning now to FIG. 5, showing a section of thermoplastic energy absorber (10), with energy absorbing lobes (200), protruding from thermoplastic energy absorber base (100)

and extending vertically beyond thermoplastic energy absorber upper bracket (120) to matingly straddle the top of support beam (20, not shown) and energy absorbing lobes (200) in the lower row extending vertically beyond thermoplastic energy absorber lower bracket (110) to matingly straddle the bottom of support beam (20, not shown). Also shown in FIG. 6 is energy absorber upper reinforcement rib (140) connecting the top of energy absorbing lobes (200) along the top wall (220), thereby optionally providing additional support to thermoplastic energy absorber (10). Likewise, thermoplastic energy absorber lower reinforcement rib (150) is illustrated, connecting energy absorbing lobes (200) along the bottom wall (240), thereby optionally providing additional support to thermoplastic energy absorber (10).

Additionally, FIG. 6 shows energy absorbing lobes (200) disposed equidistance at a maximum distance $W_1$ and minimum distance $W_2$ between adjacent energy absorbing lobes (200) in the same row. When the circumference of energy absorbing lobes (200) front face (230) defines an irregular shape, the distance between adjacent energy absorbing lobes (200) in the same row described herein, refers to the nominal distance that is the average of maximum distance $W_1$ and minimum distance $W_2$ between two adjacent energy absorbing lobes (200) side walls (210).

Turning now to FIG. 7, showing a side view of the thermoplastic energy absorber (10) shown in FIG. 6, upon impact with a height mismatch impactor (30). As shown, upon high impact (FIG. 7A), impactor (30) will impact energy absorbing lobes (200) disposed in the upper row, protruding from thermoplastic energy absorber base (100) and extending vertically beyond thermoplastic energy absorber upper bracket (120) configured to matingly straddle the top of support beam (20) such that the top wall (220) of energy absorbing lobes (200) is positioned above and being supported by the top of support beam (20). Likewise, upon low impact (FIG. 7B), impactor (30) will impact energy absorbing lobes (200) disposed in the lower row, protruding from thermoplastic energy absorber base (100) and extending vertically beyond thermoplastic energy absorber lower bracket (110), configured to matingly straddle the bottom of support beam (20) such that the bottom wall (240) of energy absorbing lobes (200) is positioned below and being supported by the bottom of support beam (20).

Figure 8A:
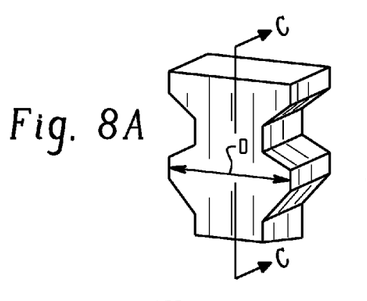
FIGS. 8A and 8B are to illustrate the cross sectional directions A-A and B-B, respectively, on an example of a crush lobe.
Figure 8B:
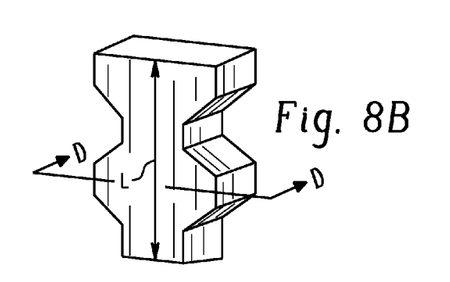
Figure 8C:
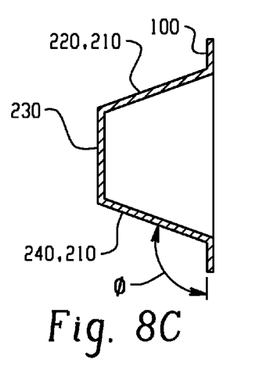
FIGS. 8C-8E illustrate several embodiments of possible side wall, top wall, bottom wall, and/or front face cross-sectional geometry based upon the cross-sections A-A of the crush lobe of FIG. 8A and the cross-section B-B of the crush lobe of FIG. 8B.
Figure 8D:
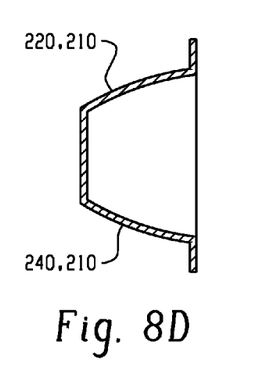
Figure 8E:
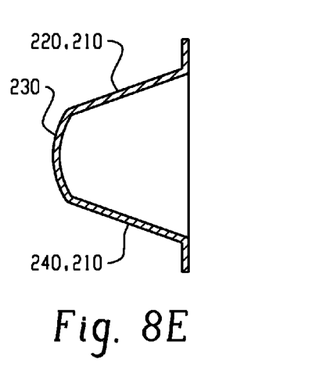

As described above, further tuning the stiffness of energy absorbing lobes (200) is shown in FIGS. 8C-8E. FIGS. 8A and 8B showing an example of an energy absorbing lobe (200) having a vertical dimension (L) and a horizontal dimension (D), where aspect ratio (L/D) is greater than unity and can be varied to modulate the stiffness of each of energy absorbing lobes (200). Further tuning of the stiffness could be achieved by varying the configuration of side wall (210), top wall (220), and/or bottom wall (240) of energy absorbing lobe (200), by for example, providing a curvature (FIG. 8D) to either or both side walls (210), top wall (220), and/or bottom wall (240). The curvature can be the same or different for each wall of energy absorbing lobe. Optionally, the wall(s) (either or both side walls (210), top wall (220), and/or bottom wall (240)) can be straight, and set at an angle (Ø), (FIG. 8C) with respect to the base (100). The angle (Ø) for each wall can be the same or different from each other. The angle (Ø) can be greater than or equal to 90°, specifically, 95° to 145°, more specifically, 100° to 125°. Additional tuning to the stiffness of energy absorbing lobes (200) can be provided by changing the degree of curvature of front face (230), making it convex for example (FIG. 8E), thereby affecting the force displacement profile obtained upon impact.

As can be seen from the various figures, the energy absorbing lobes extend from a base in a direction perpendicular to both the "x" and "y" directions (the "z" direction). The lobes form rows, wherein the energy absorber can have greater than or equal to 1 row, specifically, greater than or equal to 2 rows, more specifically, 2 to 4 rows. Optionally, the lobes can have no openings from a front surface, with the lobes open from the back surface, thereby forming a cavity (e.g., a cavity between the lobe surface and the bumper beam when the energy absorber is installed in a vehicle). Optionally, the wall(s) of the lobes can have opening(s) that affect the crush characteristics of the lobes. Alternatively, or in addition, the wall(s) can have different thicknesses (e.g., to affect the desired crush characteristics of the lobes). These energy absorbers can meet lower leg impact requirements (lower-leg impact test requirements as per EuroNCAP version 5.1, June 2011) in a packaging space of less than or equal to 80 mm, specifically, less than or equal to 70 mm, and more specifically, less than or equal to 65 mm (e.g., a thickness of the energy absorber, in the "z" direction, at its thickest point).

An energy absorbing system can comprise the thermoplastic energy absorber disposed between a bumper beam and a fascia. The fascia can optionally be configured to envelope the thermoplastic energy absorber and the bumper beam. The energy absorber can be attached directly to the bumper beam. Alternatively, the energy absorber can attach directly to another vehicle component (e.g., rails) and optionally, not directly attach to the bumper beam (e.g., be adjacent to and not joined to the bumper beam). This system passes EuroNCAP lower-leg impact requirements, version 5.1, June 2011, for lower leg impact requirement.

EXAMPLES

The efficiency of a bumper assembly is the amount of energy absorbed over distance, or the amount of energy absorbed over load. A high efficiency bumper system absorbs more energy over a shorter distance than a low efficiency energy absorber. High efficiency is achieved by building load quickly to just under the load limit of the object sought to be protected (e.g. vehicle support beam, rails etc.) and maintaining that load constant until the impact energy has been dissipated.

Figure 9:
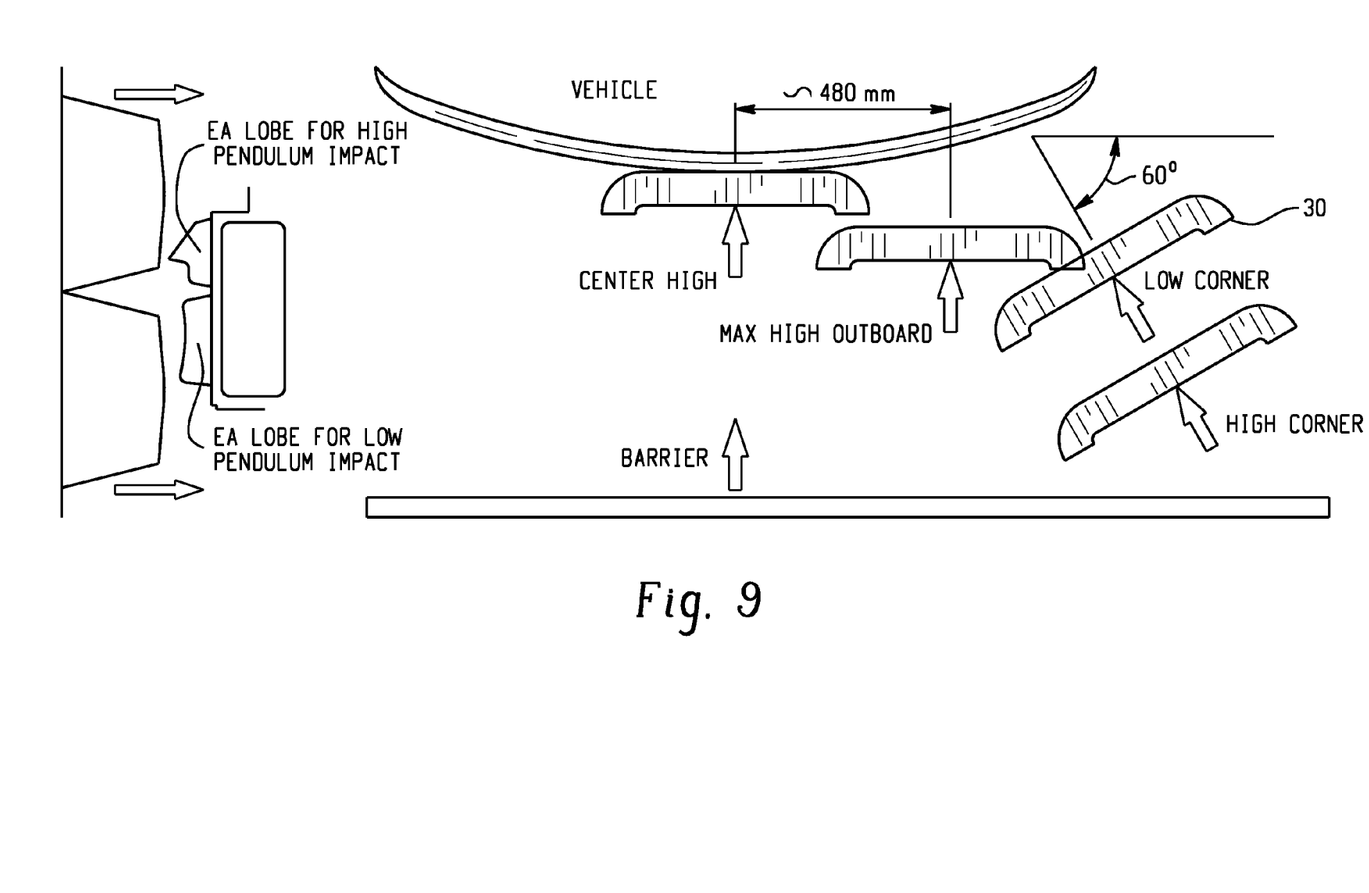
FIG. 9 is a schematic that illustrates the tests involved in FMVSS part 581 cumulative damage estimation tests.

To quantify the effectiveness of the proposed thermoplastic energy absorber, FMVSS part 581 cumulative damage estimation was performed (simulated) over a generic vehicle with a vehicle mass of 1,700 Kg. The energy absorber shown in FIG. 2 made of unfilled PC/PBT using a nominal wall thickness (e.g. average wall thickness of the walls (side walls (210), top wall (220) and bottom wall (240))) of 2.00 mm in conjunction with the vehicle parameters as shown in FIG. 9 and weighing 1.6 kilogram (kg). Impact cases considered for cumulative damage estimation and the respective performance measures achieved are shown in FIG. 9 and Table 1 respectively.

TABLE 1

| Impact Case | Energy Absorbed (J) | Force (kN) | Intrusion (mm) |
|---|---|---|---|
| High Center | 525 | 30 | 42 |
| Max High Outerboard | 525 | 25.5 | 49 |
| Low Corner | 190 | 10 | 37 |
| High Corner | 190 | 11 | 41 |
| Barrier | 900 | 52 | 47 |

Figure 10:
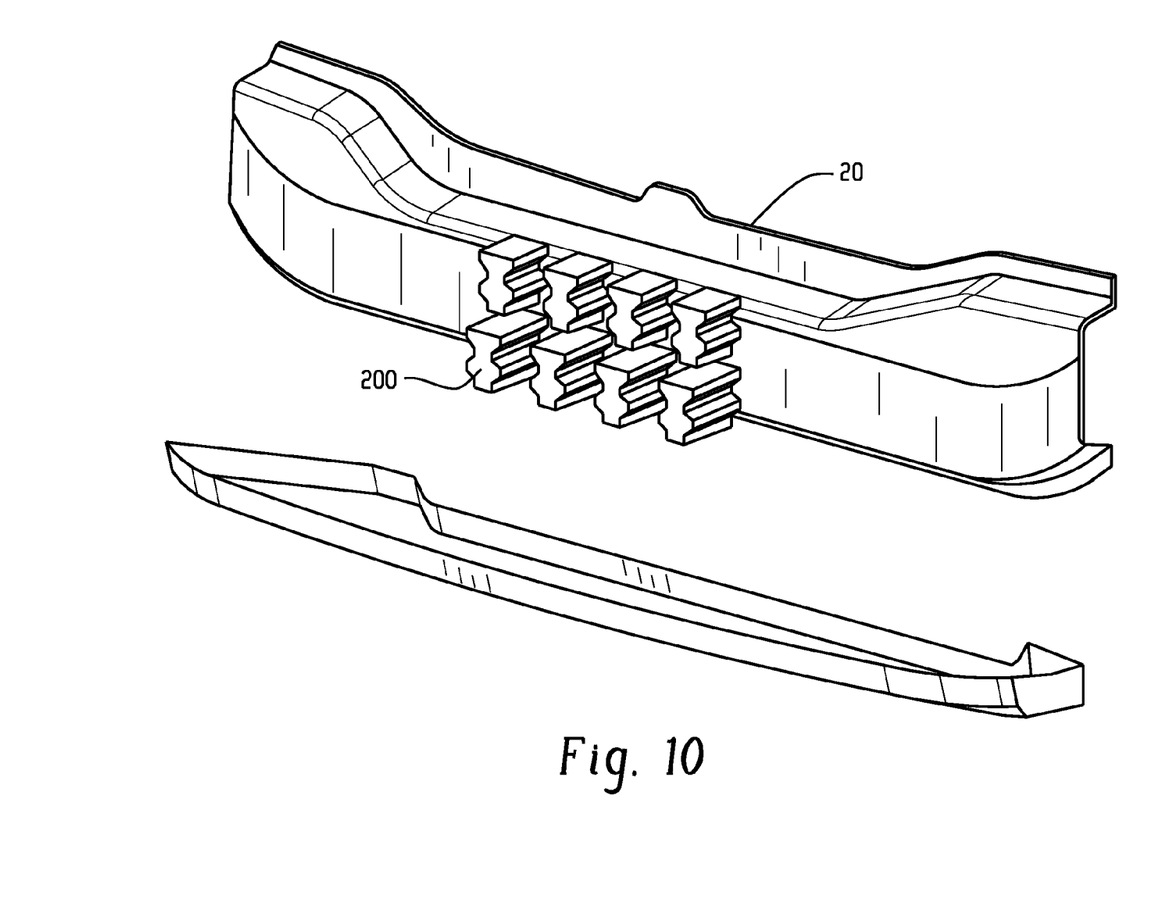
FIG. 10 is an expanded perspective view of a bumper beam with the energy absorber and a crush plate.

Compared to a conventional energy absorber as shown in FIG. 10, the thermoplastic energy absorber provided was observed to show a mass reduction of approximately 30% and a reduction in intrusion level of approximately 20%.

A portion of the unitary energy absorber was also analyzed for the lower-leg pedestrian impact performance over a generic vehicle set up as shown in FIG. 10. The performance measures for the lower-leg impact described in Table 2, was also satisfactory for a packaging space of 60 mm

TABLE 2

| Parameter | Sample | Lower-leg impact requirements as per EuroNCAP |
| --- | --- | --- |
| Packaging Space | 60 mm | Packaging space is not a part of requirements |
| Acceleration | 120 G | <150 G |
| Rotation | 9.4 Degrees | <15 Degrees |
| Shear | 1.5 mm | <6 mm |

As demonstrated in Table 2, the sample exhibits a lower deceleration (G-Load) at 120 G compared to the requirement of less than 150 G, lower rotation degree of 9.4 for the sample compared to less than 15 degrees for the requirement, and lower knee shear displacement at 1.5 mm for the sample compared to less than 6 mm required by lower-leg impact test requirements as per EuroNCAP version 5.1, June 2011.

Hence, the energy absorber described herein can have a deceleration (G-Load), tested in accordance with lower-leg impact test requirements as per EuroNCAP version 5.1, June 2011, of less than or equal to 140 G, specifically, less than or equal to 130 G, more specifically, less than or equal to 125 G, and even less than or equal to 120 G. Also tested in accordance with lower-leg impact test requirements as per EuroNCAP version 5.1, June 2011, the energy absorber can have a rotation of less than or equal to 14 degrees, specifically, less than or equal to 12 degrees, and even less than or equal to 10 degrees. The energy absorber can have a shear of less than or equal to 5 mm, specifically, less than or equal to 3 mm, and even less than or equal to 2 mm, tested in accordance to lower-leg impact test requirements as per EuroNCAP version 5.1, June 2011.

It is noted that the above mass is merely exemplary and with respect to a particular vehicle. For the thermoplastic energy absorber mass, to meet the various global requirements, is dependent on the vehicle mass, and for a vehicle with higher mass, the mass of the thermoplastic energy absorber can be increased appropriately. For example, the thermoplastic energy absorber could weigh around 8 Kg for a vehicle mass of 2,400 Kg.

Figure 11:
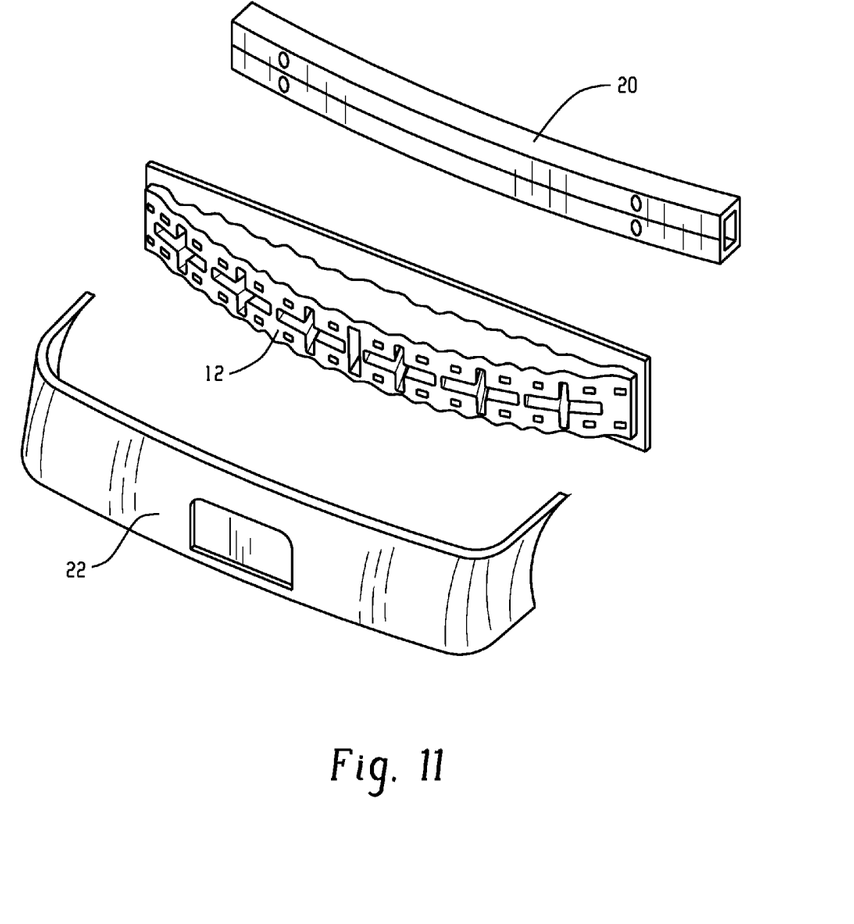
FIG. 11 shows an expanded perspective view of an energy absorbing system designed to meet FMVSS part 581 impact requirements (adapted from U.S. Pat. No. 6,406,081B1)

As mentioned earlier, the current thermoplastic energy absorber focuses on a design for low-speed vehicle damageability at a height mismatch impact. These thermoplastic energy absorbers have enabled significant savings in weight. For example, when comparing (for the same vehicle) the present thermoplastic energy absorber compared to a bumper beam system shown in FIG. 11 (with a fascia 22, "I" energy absorber 12 and bumper beam 20), and requiring both systems to meet ECE 42 (dated Nov. 21, 1980) and FMVSS part 581 (dated Apr. 25, 1990) the thermoplastic energy absorber provided demonstrates a reduction in weight of greater than 20% of the weight of the comparative bumper system, specifically greater than or equal to 25% weight reduction, and more specifically, greater than or equal to 30% weight reduction. Likewise, when comparing (for the same vehicle) the present thermoplastic energy absorber to a bumper beam system shown in FIG. 11, and requiring both systems to meet ECE 42 (dated Nov. 21, 1980) and FMVSS part 581 (dated Apr. 25, 1990), the thermoplastic energy absorber provided demonstrates a reduction in intrusion depth upon impact of greater than 10% of the intrusion depth of the comparative bumper system, specifically greater than or equal to 15% intrusion depth, and more specifically, greater than or equal to 20% intrusion depth reduction.

It is noted that the sizes and shapes of the various elements of the thermoplastic energy absorbers disclosed herein can be discussed in relation to particular figures merely for convenience and clarity (e.g., to identify which dimension is being discussed). However, the sizes are intended to apply to all possible embodiments of the various elements and not merely the specific figures with which they are discussed.

In an embodiment, a thermoplastic energy absorber having a horizontal axis and a vertical axis comprising: an array of energy absorbing lobes protruding from a base, the lobes arranged in two or more rows, wherein the energy absorbing lobes have a vertical length (L) longer than horizontal width (D), and wherein the energy absorbing lobes in each row are disposed in a staggered manner with respect to energy absorbing lobes in an adjacent row.

In an embodiment, a thermoplastic energy absorber having a horizontal axis and a vertical axis comprises: an array of energy absorbing lobes protruding from a base, the lobes arranged in two or more rows, wherein the energy absorbing lobe has a vertical length (L) longer than horizontal width (D), and wherein the energy absorbing lobes in each row are disposed in a staggered manner with respect to energy absorbing lobes in an adjacent row.

In an embodiment, a vehicle can comprise: a vehicle bumper beam (i.e. a support beam), the thermoplastic energy absorber attached to the vehicle bumper beam, a fascia partially enveloping the bumper beam, and the thermoplastic energy absorber. The thermoplastic energy absorber having a horizontal axis and a vertical axis comprising: an array of energy absorbing lobes protruding from a base, the lobes arranged in two or more rows, wherein the energy absorbing lobes have a vertical length (L) longer than horizontal width (D), and wherein the energy absorbing lobes in each row are disposed in a staggered manner with respect to energy absorbing lobes in an adjacent row. The thermoplastic energy absorber can be configured to attach to a vehicle to absorb energy upon impact.

In another embodiment, a vehicle can comprise: a vehicle bumper beam and a thermoplastic energy absorber attached to the vehicle's bumper beam. The thermoplastic energy absorber having a horizontal axis and a vertical axis comprising: an array of energy absorbing lobes protruding from a base, the lobes arranged in two or more rows, wherein the energy absorbing lobes have a vertical length (L) longer than horizontal width (D), and wherein the energy absorbing lobes in each row are disposed in a staggered manner with respect to energy absorbing lobes in an adjacent row. The vehicle passes FMVSS part 581 (dated Apr. 25, 1990) requirements.

In an embodiment, a vehicle can comprise: a vehicle bumper beam and a thermoplastic energy absorber attached to the vehicle's bumper beam. The thermoplastic energy absorber having a horizontal axis and a vertical axis comprising: an array of energy absorbing lobes protruding from a base, the lobes arranged in two or more rows, wherein the energy absorbing lobes have a vertical length (L) longer than horizontal width (D), and wherein the energy absorbing lobes in each row are disposed in a staggered manner with respect to energy absorbing lobes in an adjacent row. The vehicle passes ECE 42 (dated Nov. 21, 1980) requirements.

A thermoplastic energy absorber having a horizontal axis and a vertical axis comprising: an array of energy absorbing lobes protruding from a base, the lobes arranged in two or more rows, wherein the energy absorbing lobes have a vertical length (L) longer than horizontal width (D), and wherein the energy absorbing lobes in each row are disposed in a staggered manner with respect to energy absorbing lobes in an adjacent row. The thermoplastic energy absorber can be configured to attach to a vehicle to absorb energy upon impact. A vehicle can comprise: a vehicle support beam, the thermoplastic energy absorber coupled to the vehicle support beam, and a fascia, partially enveloping the vehicle support beam and the thermoplastic energy absorber.

A thermoplastic energy absorber having a horizontal axis and a vertical axis can comprise: an array of energy absorbing lobes protruding from a base, the lobes arranged in two or more rows. The energy absorbing lobes can have a vertical length (L) and a horizontal width (D), and wherein a ratio of L:D is greater than 1. The energy absorbing lobes in each row can be disposed in a staggered manner with respect to energy absorbing lobes in an adjacent row. The energy absorber can be configured to be installed on a vehicle for absorption of impact energy.

An energy absorbing system can comprise: the thermoplastic energy absorber disposed between a bumper beam and a fascia. The fascia can optionally be configured to envelope the thermoplastic energy absorber and the bumper beam. This system passes EuroNCAP lower-leg impact requirements, version 5.1, June 2011, for lower leg impact requirement.

In the various embodiments, (i) each of the energy absorbing lobes has a front face defining a polygon shape, a rounded shape, or a combination comprising at least one of the foregoing; and/or (ii) wherein the energy absorbing lobes comprise a corrugated circumference; and/or (iii) the vertical length (L) is 3 to 30 cm; and/or (iv) the horizontal width (D) is 2 to 20 cm; and/or (v) the L:D ratio is 10:9 to 5:1; and/or (vi) the energy absorbing lobes are staggered such that, any impact on the energy absorber will contact at least one of the energy absorbing lobes; and/or (vii) the energy absorbing lobes of one row overlap energy absorbing lobes of another row by greater than 0% to 50% of D; and/or (viii) the energy absorbing lobes of one row overlap energy absorbing lobes of another row by 2% to 15% of D.

All ranges disclosed herein are inclusive of the endpoints, and the endpoints are independently combinable with each other. "Combination" is inclusive of blends, mixtures, alloys, reaction products, and the like. The terms "a," "an," and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the wall(s) includes one or more walls). Reference throughout the specification to "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments. "Coupled" includes both direct connection and indirect connection through one or more other components. In addition, the term "including" has the same broad meaning as the term "comprising."

While particular embodiments have been described, alternatives, modifications, variations, improvements, and substantial equivalents that are or can be presently unforeseen may arise to applicants or others skilled in the art. Accordingly, the appended claims as filed and as they can be amended are intended to embrace all such alternatives, modifications variations, improvements, and substantial equivalents.

What is claimed is:

1. A thermoplastic energy absorber having a horizontal axis and a vertical axis comprising:
    an array of energy absorbing lobes protruding from a base, the lobes arranged in two or more rows;
    wherein the energy absorbing lobes have a vertical length (L) and a horizontal width (D), and wherein a ratio of L:D is greater than 1;
    wherein the energy absorbing lobes in each row are disposed in a staggered manner with respect to energy absorbing lobes in an adjacent row; and
    wherein the energy absorber is configured to be installed on a vehicle for absorption of impact energy.

2. The thermoplastic energy absorber of claim 1, wherein each of the energy absorbing lobes have a front face defining a polygon shape, a rounded shape, or a combination comprising at least one of the foregoing.

3. The thermoplastic energy absorber of claim 1, wherein the energy absorbing lobes comprise a corrugated circumference.

4. The thermoplastic energy absorber of claim 1, wherein the vertical length (L) is 3 to 30 cm.

5. The thermoplastic energy absorber of claim 1, wherein the horizontal width (D) is 2 to 20 cm.

6. The thermoplastic energy absorber of claim 1, wherein the L:D ratio is 10:9 to 5:1.

7. The thermoplastic energy absorber of claim 1, wherein the energy absorbing lobes are staggered such that, any impact on the energy absorber will contact at least one of the energy absorbing lobes.

8. The thermoplastic energy absorber of claim 1, wherein the energy absorbing lobes of one row overlap energy absorbing lobes of another row by greater than 0% to 50% of D.

9. The thermoplastic energy absorber of claim 1, wherein the energy absorbing lobes of one row overlap energy absorbing lobes of another row by 2% to 15% of D.

10. An energy absorbing system comprising:
    a bumper beam;
    a fascia; and
    the thermoplastic energy absorber located between the bumper beam and fascia, wherein the energy absorber comprises
        an array of energy absorbing lobes protruding from a base, the lobes arranged in two or more rows;
    wherein the energy absorbing lobes have a vertical length (L) and a horizontal width (D), and wherein a ratio of L:D is greater than 1;
    wherein the energy absorbing lobes in each row are disposed in a staggered manner with respect to energy absorbing lobes in an adjacent row; and
    wherein the energy absorber is configured to be installed on a vehicle for absorption of impact energy;
    wherein the fascia is configured to envelope the thermoplastic energy absorber and the bumper beam; and
    wherein the vehicle passes EuroNCAP lower-leg impact requirements, version 5.1, June 2011, for lower leg impact requirement.

11. The thermoplastic energy absorber of claim 1, the energy absorbing lobes in each row are aligned in the "y" direction with a gap between two energy absorbing lobes in the adjacent row.

12. The thermoplastic energy absorber of claim 1, wherein the lobes of a row are in alignment with all other lobes of the same row in an "X" direction.

13. The thermoplastic energy absorber of claim 1, wherein each energy absorbing lobe has a corresponding empty space in the same position of the adjacent row.

\* \* \* \* \*